United States Patent
Ishihara

(10) Patent No.: US 11,176,747 B2
(45) Date of Patent: Nov. 16, 2021

(54) INFORMATION PROCESSING APPARATUS AND INFORMATION PROCESSING METHOD

(71) Applicant: SONY CORPORATION, Tokyo (JP)

(72) Inventor: Atsushi Ishihara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/757,982

(22) PCT Filed: Jul. 30, 2018

(86) PCT No.: PCT/JP2018/028442
§ 371 (c)(1),
(2) Date: Apr. 21, 2020

(87) PCT Pub. No.: WO2019/087491
PCT Pub. Date: May 9, 2019

(65) Prior Publication Data
US 2020/0342671 A1    Oct. 29, 2020

(30) Foreign Application Priority Data
Oct. 30, 2017  (JP) ............................. JP2017-208803

(51) Int. Cl.
*G06T 19/00*   (2011.01)

(52) U.S. Cl.
CPC .................................. *G06T 19/006* (2013.01)

(58) Field of Classification Search
None
See application file for complete search history.

(56) References Cited

U.S. PATENT DOCUMENTS

| | | | |
|---|---|---|---|
| 9,898,871 B1* | 2/2018 | Reagan | G06T 19/006 |
| 10,614,605 B2* | 4/2020 | Kasahara | G06T 11/60 |
| 2005/0068314 A1* | 3/2005 | Aso | G06T 7/73 |
| | | | 345/419 |

(Continued)

FOREIGN PATENT DOCUMENTS

| | | |
|---|---|---|
| CN | 105814876 A | 7/2016 |
| JP | 2012-238117 A | 12/2012 |

(Continued)

OTHER PUBLICATIONS

International Search Report and Written Opinion of PCT Application No. PCT/JP2018/028442, dated Oct. 9, 2018, 10 pages of ISRWO.

*Primary Examiner* — Robert J Craddock
(74) *Attorney, Agent, or Firm* — Chip Law Group

(57) ABSTRACT

There is provided an information processing apparatus that includes a spatial information acquisition unit that acquires information on a real object disposed in a real space, and a display control unit that, if a distance between a user and a virtual object is a first distance, exercises control such that a first display object is displayed by a display device as the virtual object on the basis of the real object and first processing, and that, if the distance between the user and the virtual object is a second distance that differs from the first distance, exercises control such that a second display object is displayed by the display device as the virtual object on the basis of the real object and second processing that differs from the first processing.

20 Claims, 14 Drawing Sheets

(56) References Cited

U.S. PATENT DOCUMENTS

| | | | |
|---|---|---|---|
| 2005/0179617 A1* | 8/2005 | Matsui | G06T 19/006 |
| | | | 345/7 |
| 2007/0094519 A1 | 4/2007 | Yamamoto | |
| 2015/0187140 A1* | 7/2015 | Tseng | G06T 15/503 |
| | | | 345/633 |
| 2016/0320863 A1 | 11/2016 | Shimoda | |
| 2019/0385371 A1* | 12/2019 | Joyce | G06T 19/006 |

FOREIGN PATENT DOCUMENTS

| | | |
|---|---|---|
| JP | 2015-119373 A | 6/2015 |
| JP | 2016-194744 A | 11/2016 |
| JP | 2017-174125 A | 9/2017 |
| KR | 10-2016-0101910 A | 8/2016 |
| WO | 2005/038638 A1 | 4/2005 |

\* cited by examiner

FIG.4
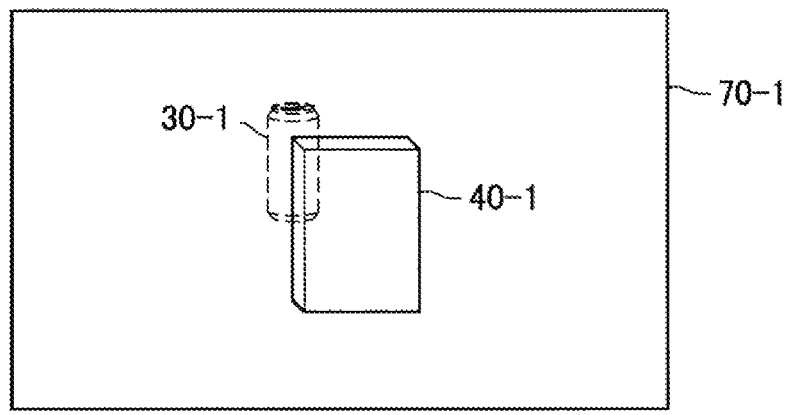
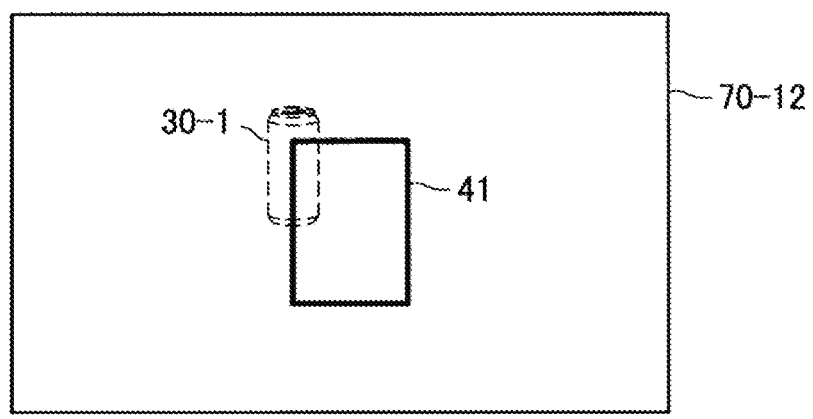
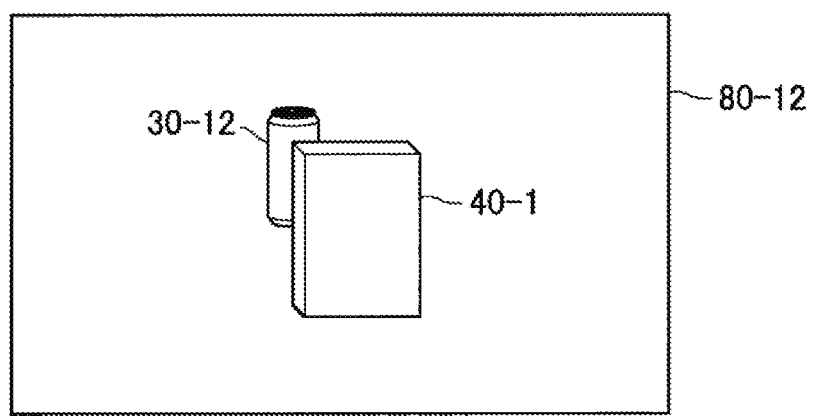

FIG.5
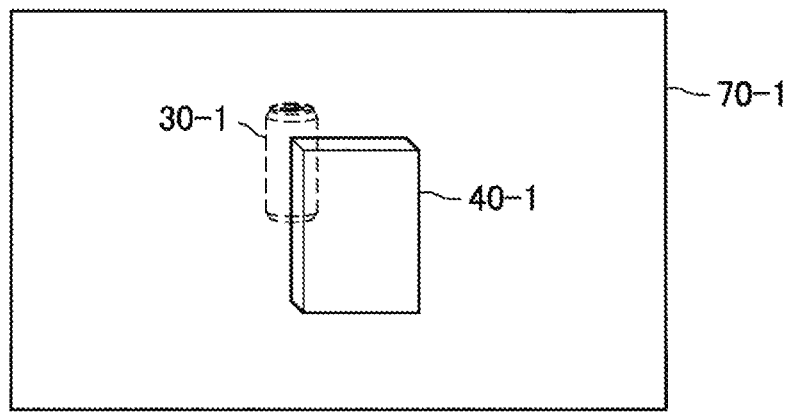
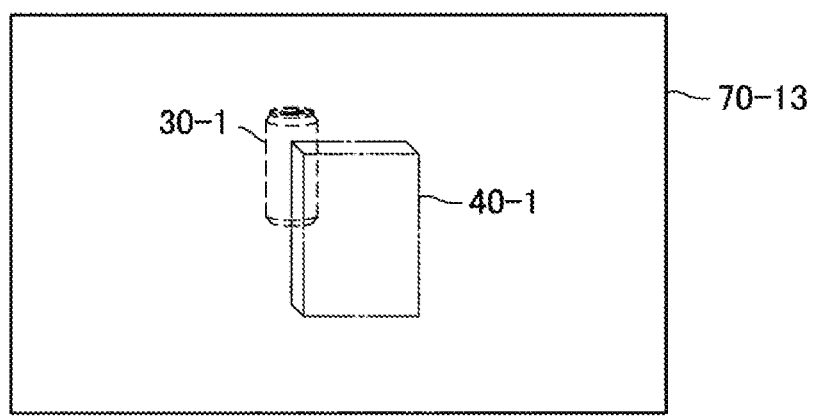
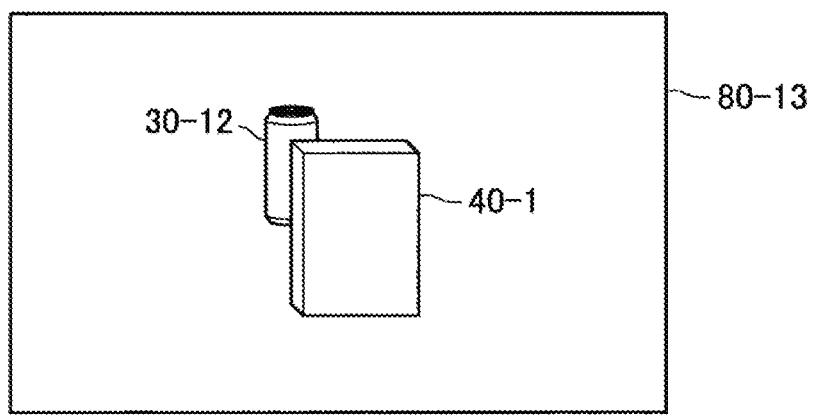

FIG.6
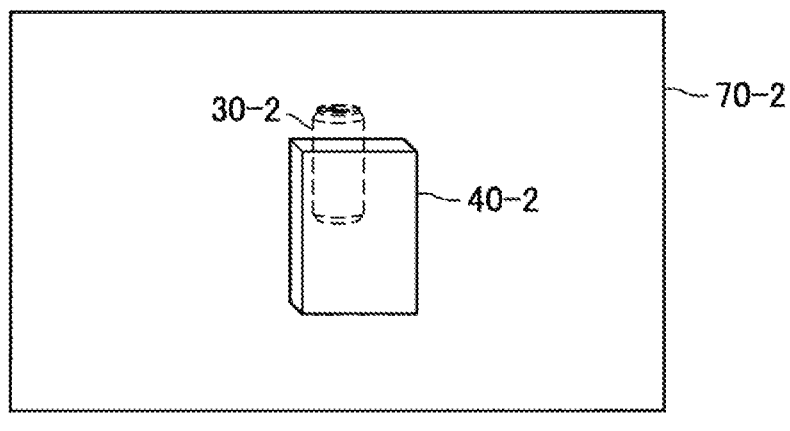
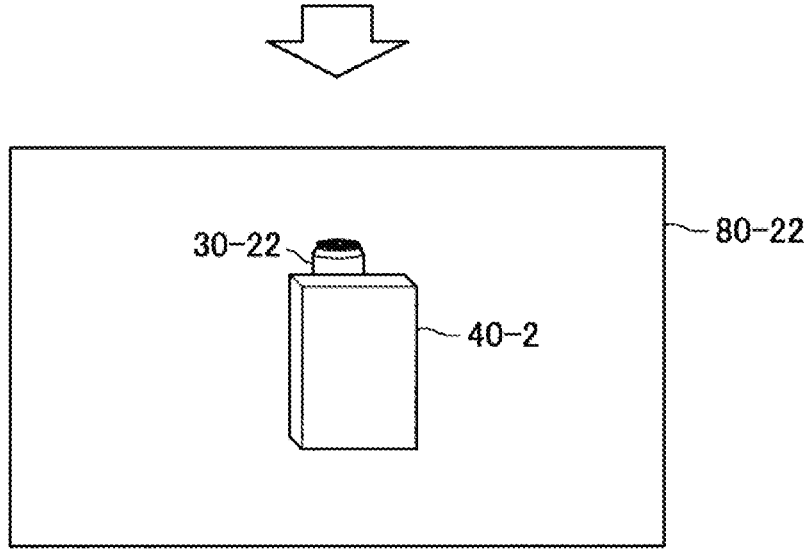

FIG.7
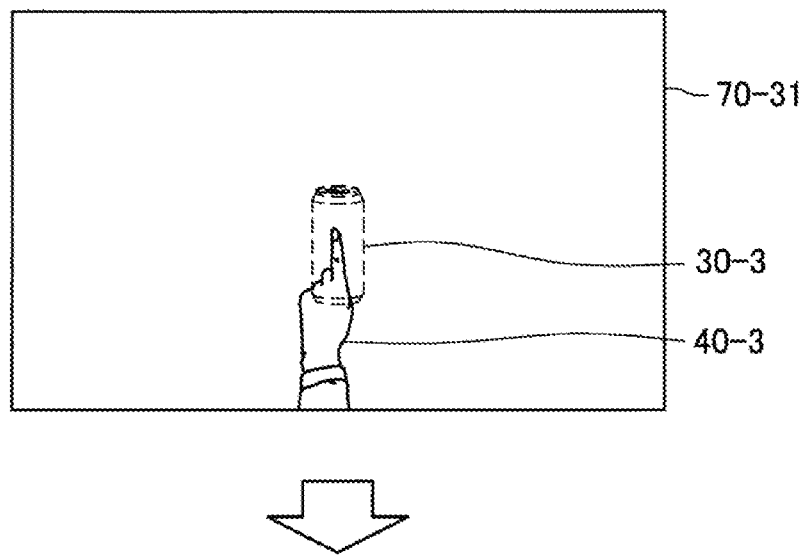
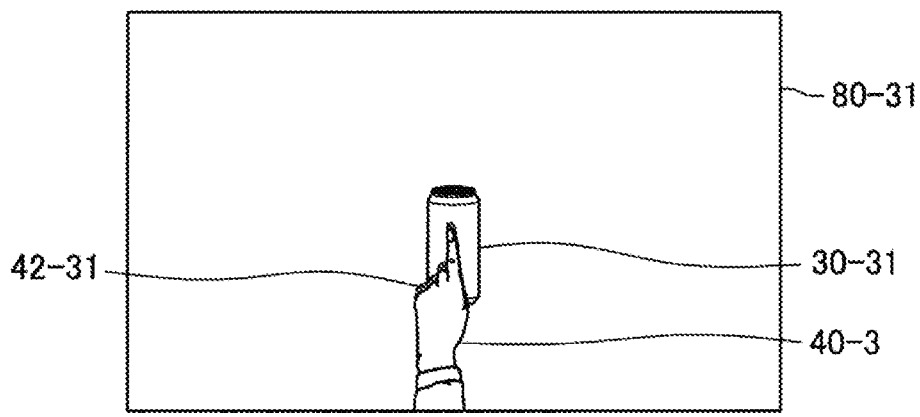

FIG.8
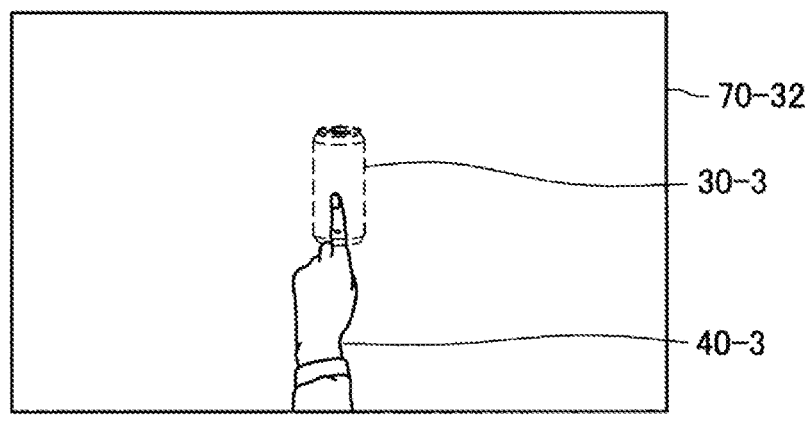
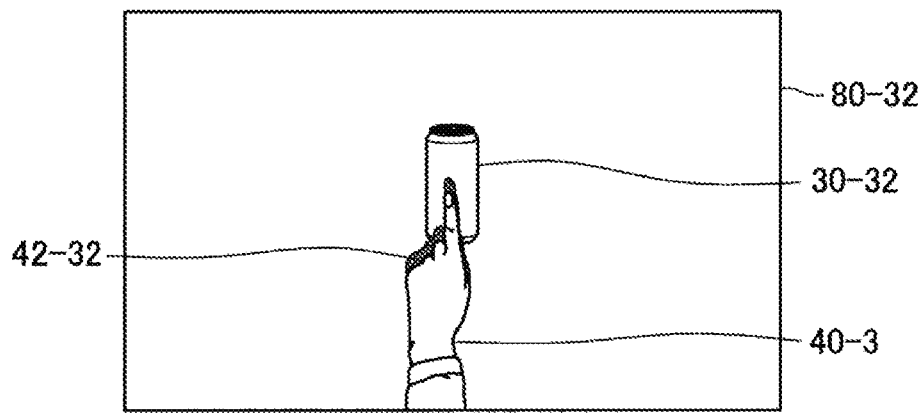

FIG.9
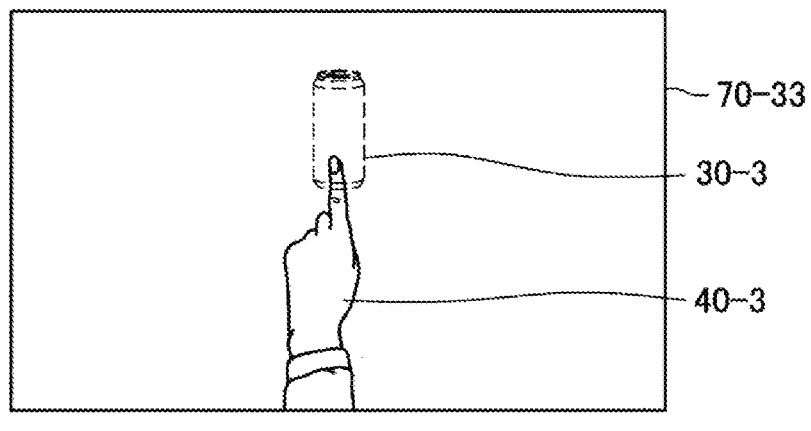
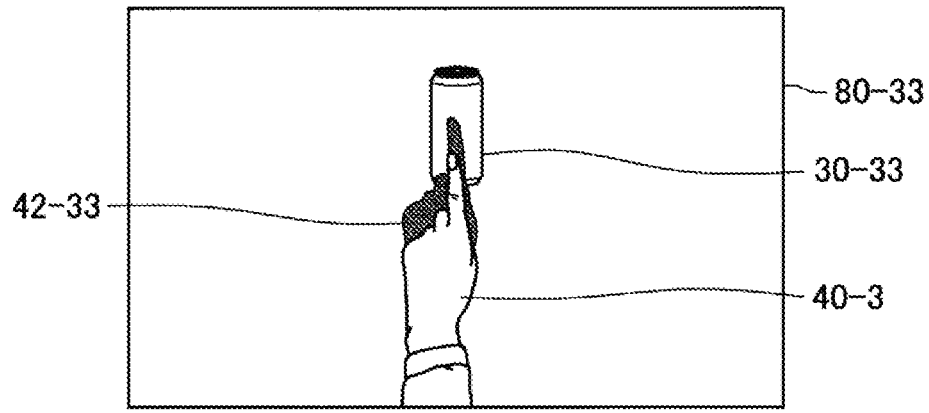

FIG.10
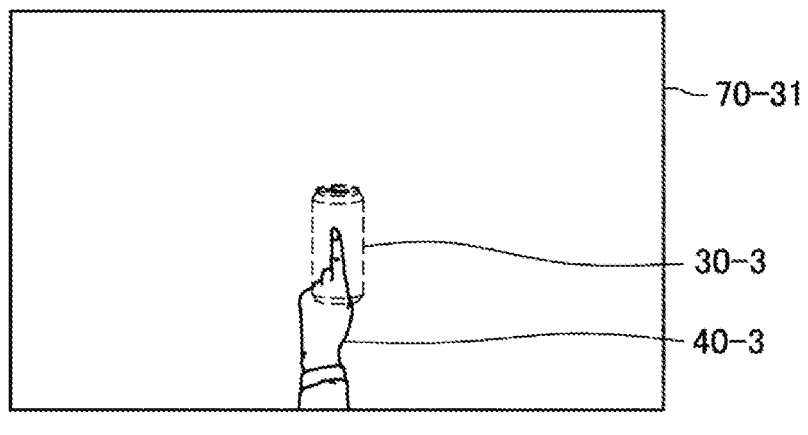
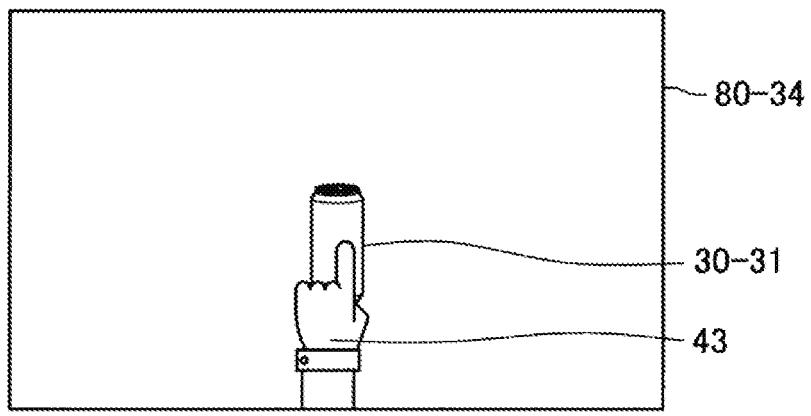

FIG.11
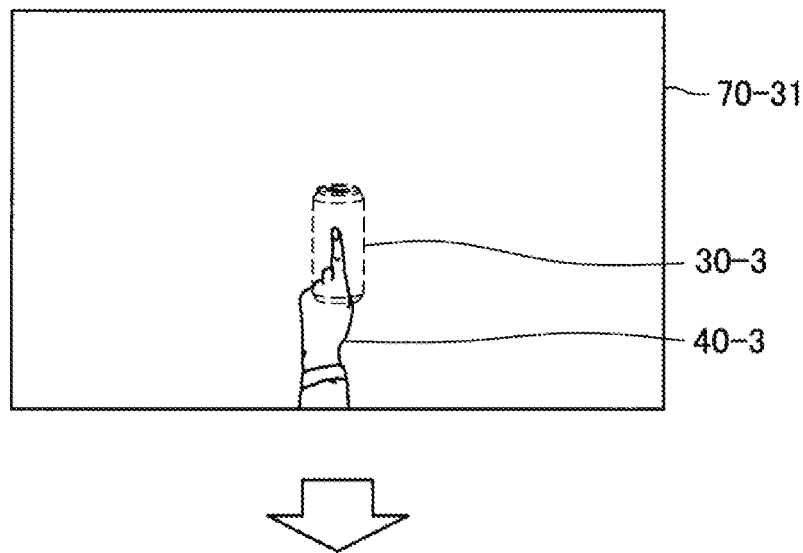
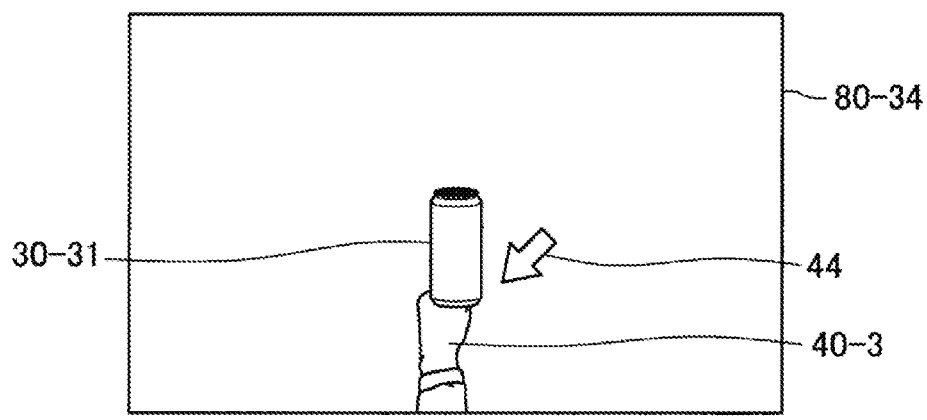

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/028442 filed on Jul. 30, 2018, which claims priority benefit of Japanese Patent Application No. JP 2017-208803 filed in the Japan Patent Office on Oct. 30, 2017. Each of the above-referenced applications is hereby incorporated herein by reference in its entirety.

FIELD

The present disclosure relates to an information processing apparatus, an information processing method, and a program.

BACKGROUND

In recent years, techniques for presenting virtual objects to a user have been disclosed. For example, a technique for feeding back, to a user, a user shadow that is generated on a virtual object has been disclosed (see Patent Literature 1, for example). In this technique, a display control method that a user shadow generated on a virtual object is enlarged as the distance between the user and the virtual object increases is adopted. The user easily gains a sense of the distance between the user and the virtual object by viewing the user shadow generated on the virtual object.

CITATION LIST

Patent Literature

Patent Literature 1: Japanese Unexamined Patent Publication No. 2016-194744.

SUMMARY

Technical Problem

Nevertheless, a suitable method for controlling a virtual object display may vary according to the distance between a user and a virtual object. By way of an example, a case is assumed where the accuracy of detection of the distance between a user and a real object that blocks a virtual object varies according to the distance between the user and the virtual object. A case is assumed where, if the accuracy of detection of the distance between the user and the real object varies, the suitable method for controlling a virtual object display also varies. Thus, controlling a virtual object display by means of a suitable display control method according to the distance between the user and the virtual object is desirable.

Solution to Problem

According to the present disclosure, an information processing apparatus is provided that includes: a spatial information acquisition unit that acquires information on a real object disposed in a real space; and a display control unit that, if a distance between a user and a virtual object is a first distance, exercises control such that a first display object is displayed by a display device as the virtual object on the basis of the real object and first processing, and that, if the distance between the user and the virtual object is a second distance that differs from the first distance, exercises control such that a second display object is displayed by the display device as the virtual object on the basis of the real object and second processing that differs from the first processing.

According to the present disclosure, an information processing method is provided that includes: acquiring, by a processor, information on a real object disposed in a real space; and if a distance between a user and a virtual object is a first distance, exercising control such that a first display object is displayed by a display device as the virtual object on the basis of the real object and first processing, and if the distance between the user and the virtual object is a second distance that differs from the first distance, exercising control such that a second display object is displayed by the display device as the virtual object on the basis of the real object and second processing that differs from the first processing.

According to the present disclosure, a program is provided that causes a computer to function as an information processing apparatus that comprises: a spatial information acquisition unit that acquires information on a real object disposed in a real space; and a display control unit that, if the distance between a user and a virtual object is a first distance, exercises control such that a first display object is displayed by a display device as the virtual object on the basis of the real object and first processing, and that, if the distance between the user and the virtual object is a second distance that differs from the first distance, exercises control such that a second display object is displayed by the display device as the virtual object on the basis of the real object and second processing that differs from the first processing.

Advantageous Effects of Invention

As described hereinabove, according to the present disclosure, a technique enabling a virtual object display to be controlled by means of a suitable display control method according to the distance between a user and a virtual object is provided. Note that the foregoing advantageous effects are not necessarily limited, rather, any advantageous effects disclosed in the present specification or other advantageous effects which can be ascertained from the present specification may be included in addition to or instead of the foregoing advantageous effects.

BRIEF DESCRIPTION OF DRAWINGS

FIG. 4 is a diagram to illustrate a first example of display control in a case where a virtual object is disposed at a remote distance.

FIG. 5 is a diagram to illustrate a second example of display control in a case where a virtual object is disposed at a remote distance.

FIG. 6 is a diagram to illustrate an example of display control in a case where a virtual object is disposed at a middle distance.

FIG. 7 is a diagram to illustrate a first example of display control in a case where a virtual object is disposed at a short distance.

FIG. 8 is a diagram to illustrate a second example of display control in a case where a virtual object is disposed at a short distance.

FIG. 9 is a diagram to illustrate a third example of display control in a case where a virtual object is disposed at a short distance.

FIG. 10 is a diagram to illustrate a fourth example of display control in a case where a virtual object is disposed at a short distance.

FIG. 11 is a diagram to illustrate a fifth example of display control in a case where a virtual object is disposed at a short distance.

DESCRIPTION OF EMBODIMENTS

Figure 1:
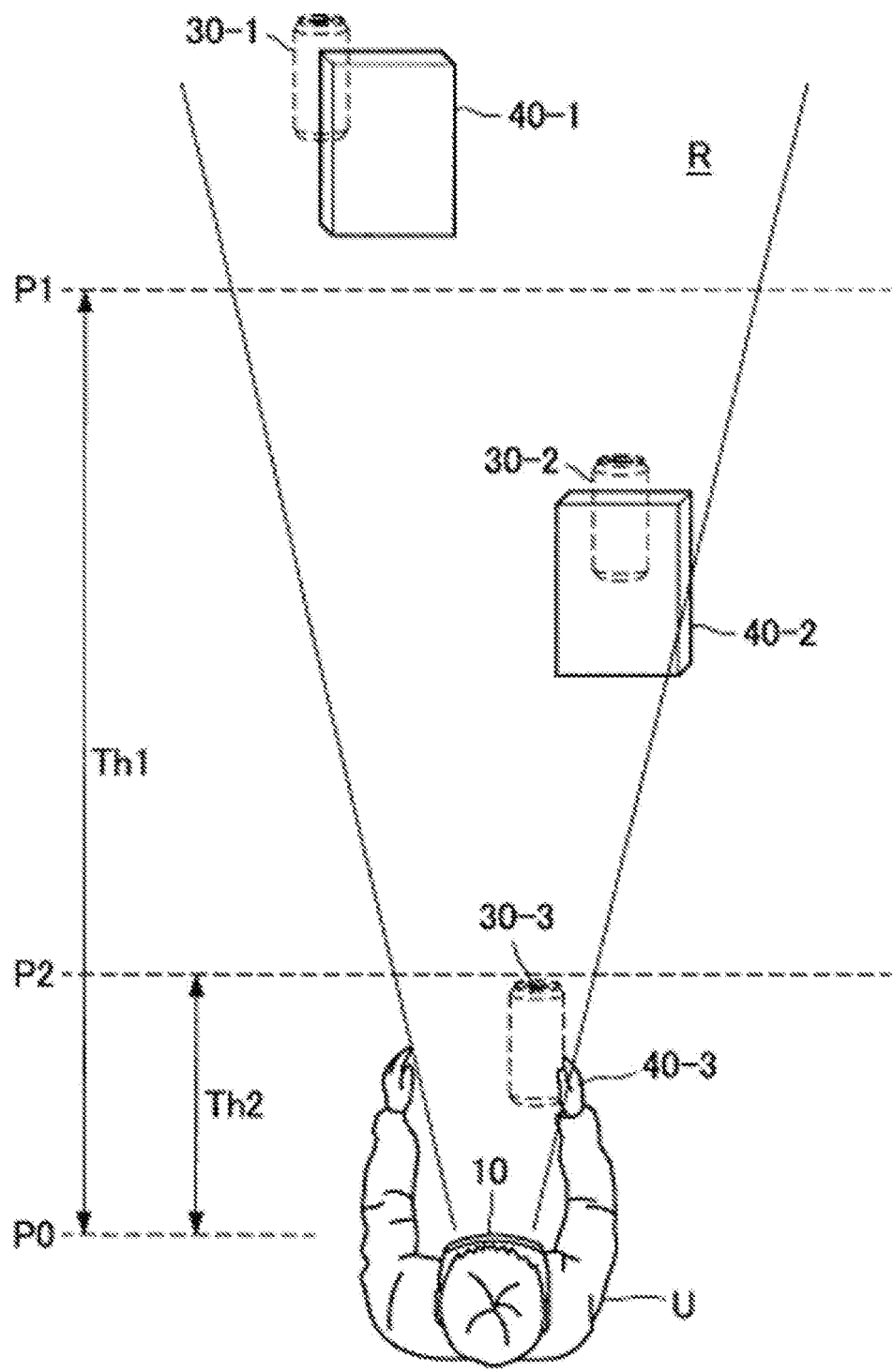
FIG. 1 is a diagram to illustrate an overview of an embodiment of the present disclosure.

Preferred embodiments of the present disclosure will be explained in detail hereinbelow with reference to the accompanying drawings. Note that duplicate descriptions are omitted from the present specification and drawings by assigning the same reference signs to constituent elements which have substantially the same function configurations.

Furthermore, in the present specification and drawings, a plurality of constituent elements having substantially the same or similar function configurations are sometimes distinguished by appending different numerals to the end of the same reference signs. However, if there is no particular need to distinguish between a plurality of constituent elements having substantially the same or similar function configurations, only identical reference signs are appended. Furthermore, similar constituent elements of different embodiments are sometimes distinguished by appending different alphabetical characters to the end of the same reference signs. However, if there is no particular need to distinguish between similar constituent elements, only identical reference signs are appended.

Note that descriptions will be provided according to the following order:

0. Overview
1. Details of the embodiment
1.1. Function configuration example of information processing apparatus
1.2. Details of information processing apparatus functions
1.3. Operation example of information processing apparatus
1.4 Various modification examples
2. Hardware configuration example
3. Conclusion

0. OVERVIEW

An overview of an embodiment of the present disclosure will be described first with reference to FIG. 1. In recent years, techniques for presenting virtual objects to a user have been disclosed. For example, a technique for feeding back, to a user, a user shadow that is generated on a virtual object has been disclosed. In this technique, a display control method that a user shadow generated on a virtual object is enlarged as the distance between the user and the virtual object increases is adopted. The user easily gains a sense of the distance between the user and the virtual object by viewing the user shadow generated on the virtual object.

Nevertheless, a suitable method for controlling a virtual object display may change according to the distance between a user and a virtual object. The present disclosure will be described in detail with reference to FIG. 1. FIG. 1 is a diagram to illustrate an overview of an embodiment of the present disclosure. Referring to FIG. 1, a user U is in a real space R. Furthermore, a position spaced apart by a distance Th2 from a position P0 where the user U exists is illustrated as a "position P2", and a position spaced apart by a distance Th1 from the position P0 where the user U exists is illustrated as a "position P1". In the following description, because the distance Th1 and the distance Th2 are used as threshold values, the distance Th1 is also referred to as "threshold value Th1" and the distance Th2 as the "threshold value Th2".

Here, the threshold value Th1 and threshold value Th2 may be determined beforehand. However, the threshold value Th1 and threshold value Th2 are not limited to being determined beforehand as any particular values. By way of an example, by using the position P0 where the user U exists as a reference, the threshold value Th2 may be a maximum distance to a position in which the user U is assumed to be able to touch with their hand by extending their hand in a stationary state. Furthermore, by way of an example, by using the position P0 of the user U as a reference, the threshold value Th1 may be a minimum distance to a position in which a drop in visibility for the user U is assumed.

In the following description, by using the position P0 where the user U exists as a reference, distances below the threshold value Th2 are also called "short distances (P0≤P<P2)". Furthermore, by using the position P0 where the user U exists as a reference, distances equal to or greater than the threshold value Th2 and below the threshold value Th1 are also called "middle distances (P2≤P<P1)". In addition, by using the position P0 where the user U exists as a reference, distances equal to or greater than the threshold value Th1 are also called "remote distances (P>P1)".

Referring to FIG. 1, an example in which a virtual object 30-1 and a real object 40-1 are arranged at a remote distance (P>P1) is illustrated. In addition, an example in which a virtual object 30-2 and a real object 40-2 are arranged at a middle distance (P2≤P<P1) is illustrated. Further, an example in which a virtual object 30-3 and a real object 40-3 are arranged at a short distance (P2≤P<P1) is illustrated.

Note that FIG. 1 illustrates cylindrical objects as examples of virtual objects 30 but there are no particular limitations on the types of the virtual objects 30 (for example, the shape, size, color, brightness, movement, and the like of the virtual objects 30). Furthermore, FIG. 1 illustrates box-shaped objects and the hands of the user U as examples of the real objects 40, but there are no particular limitations on the types of the real objects 40 (for example, the shape, size, color, brightness, movement, and the like of the real objects 40).

For example, the information processing apparatus 10 detects the distance between the user U and the real objects 40 as an example of real object information. According to the embodiment of the present disclosure, the information processing apparatus 10 includes a stereoscopic camera and a case is mainly assumed in which a depth map is generated on the basis of a left image and a right image which are captured by the stereoscopic camera and the distance between the user U and the real objects 40 is detected on the basis of the depth map. However, the distance between the user U and the real objects 40 may be detected in any way. For example, in a case where the information processing apparatus 10 includes a distance sensor sensor, the distance between the user U and the real objects 40 may be detected by means of the distance sensor. The distance sensor may be a time-of-flight (TOF) sensor or the like.

Referring to FIG. 1, a case where the information processing apparatus 10 is configured from a goggles-type head-mounted display (HMD) that is worn on the head of the user U is illustrated by way of example. However, the form of the HMD is not limited to a goggles-type HMD and may be a glasses-type HMD or the like. Moreover, the information processing apparatus 10 is not limited to being an HMD. For example, the information processing apparatus 10 may be a smartphone, a tablet terminal, a mobile phone, or another mobile device.

In addition, in the embodiment of the present disclosure, a case is mainly assumed in which the information processing apparatus 10 includes a transparent display. Here, the user U is able to visually confirm the virtual objects 30 displayed by the display and visually confirm the real objects 40 behind the display. However, the information processing apparatus 10 may also include a non-transparent display. At this time, the user U is able to visually confirm the virtual objects 30 displayed by the display and real objects via images that are captured by the camera of the information processing apparatus 10 and displayed by the display.

Here, a case is assumed in which the accuracy of detection of the distance between the user U and a real object 40 that blocks a virtual object 30 varies according to the distance between the user U and the virtual object 30. For example, if the virtual object 30-1 is disposed at a remote distance (P>P1), it is assumed that the distance between the user U and the real object 40-1 that blocks the virtual object 30-1 increases and therefore the accuracy of detection of the distance between the user U and the real object 40-1 is degraded.

In addition, if the virtual object 30-3 is disposed at a short distance (P0≤P<P2), the parallax between the left and right images captured by the stereoscopic camera becomes large due to the short distance between the user U and the real object 40-3 that blocks the virtual object 30-3. Hence, it may be assumed that, even for an area that can be visually confirmed by the user U, an area for which distance is not detectable is generated in a depth map to be generated from the left and right images, thereby degrading the accuracy of detection of the distance between the user U and the real object 40-3.

Thus, a case is assumed in which, if the accuracy of detection of the distance between the user U and the real objects 40 varies, the suitable method for controlling a display of the virtual objects 30 also varies. Therefore, the present specification mainly proposes a technique for controlling the display of virtual objects 30 by means of a suitable display control method according to the distance between the user U and the real objects 40.

In the following description, examples of display control methods include blocking processing. Blocking processing may correspond to processing in which an area (also called a "blocked area" hereinbelow) of a virtual object 30 located behind a real object 40, using the position of the user U as a reference, is removed from the virtual object 30 (not rendered as the virtual object 30) to generate, as a display object, a virtual object after area removal. Thus, control of the display of the virtual object 30 which is more natural for the user U may be implemented.

By way of an example, if the virtual object 30-1 is disposed at a remote distance (P>P1), it is assumed that the accuracy of detection of the distance between the user U and the real object 40-1 that blocks the virtual object 30-1 is degraded. In addition, if the virtual object 30-1 is disposed at a remote distance (P>P1), it is assumed that the visibility of the virtual object 30-1 for the user U is degraded.

Therefore, if the virtual object 30-1 is disposed at a remote distance (P>P1), the display of the virtual object 30-1 may also be controlled on the basis of further simplified processing. Thus, the processing costs required to control the display of the virtual object 30-1 are reduced.

In particular, because blocking processing is typically performed each time a virtual object 30 is displayed, there is sometimes a great need to reduce the processing costs required to control the display of the virtual object 30-1. Additionally, if the information processing apparatus 10 is a mobile device, there are constraints on the power consumption and the amount of heat generated by the processor, and hence there is sometimes a great need to reduce the processing costs required to control the display of the virtual object 30-1. Therefore, such a need may be satisfied by controlling the display of the virtual object 30-1 on the basis of further simplified processing.

By way of another example, if the virtual object 30-3 is disposed at a short distance (P0≤P<P2), it is assumed that the accuracy of detection of the distance between the user U and the real object 40-3 that blocks the virtual object 30-3 is degraded. In addition, if the virtual object 30-3 is disposed at a short distance (P0≤P<P2), the user U may sometimes consider bringing the real object 40-3 into contact with the virtual object 30-3 or manipulating the virtual object 30-3 by means of the real object 40-3. Hence, the user U may sometimes consider gaining a sense of the distance between the virtual object 30-3 and the real object 40-3.

Hence, if the virtual object 30-3 is disposed at a short distance (P0≤P<P2), by removing a larger area than the blocking area from the virtual object 30-3, a virtual object after area removal may be generated as a display object. Thus, the user U easily ascertains the distance between the virtual object 30-3 and the real object 40-3 according to the size of the area removed from the virtual object 30-3.

An overview of the embodiment of the present disclosure has been described hereinabove.

1. DETAILS OF THE EMBODIMENT

The details of the embodiment of the present disclosure will be described next.

1.1. Function Configuration Example of Information Processing Apparatus

Figure 2:
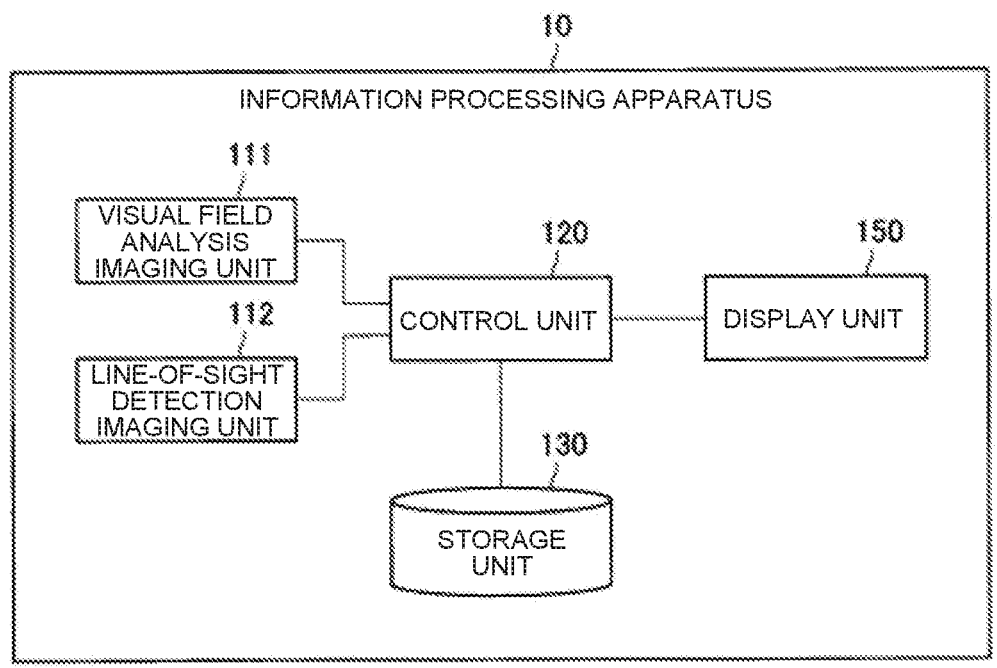
FIG. 2 is a diagram illustrating a function configuration example of an information processing apparatus according to the embodiment of the present disclosure.

Next, a function configuration example of the information processing apparatus 10 according to the embodiment of the present disclosure will be described. FIG. 2 is a diagram illustrating a function configuration example of the information processing apparatus 10 according to the embodiment of the present disclosure. As illustrated in FIG. 2, the information processing apparatus 10 includes a visual field analysis imaging unit 111, a line-of-sight detection imaging unit 112, a control unit 120, a storage unit 130, and a display unit 150.

Figure 3:
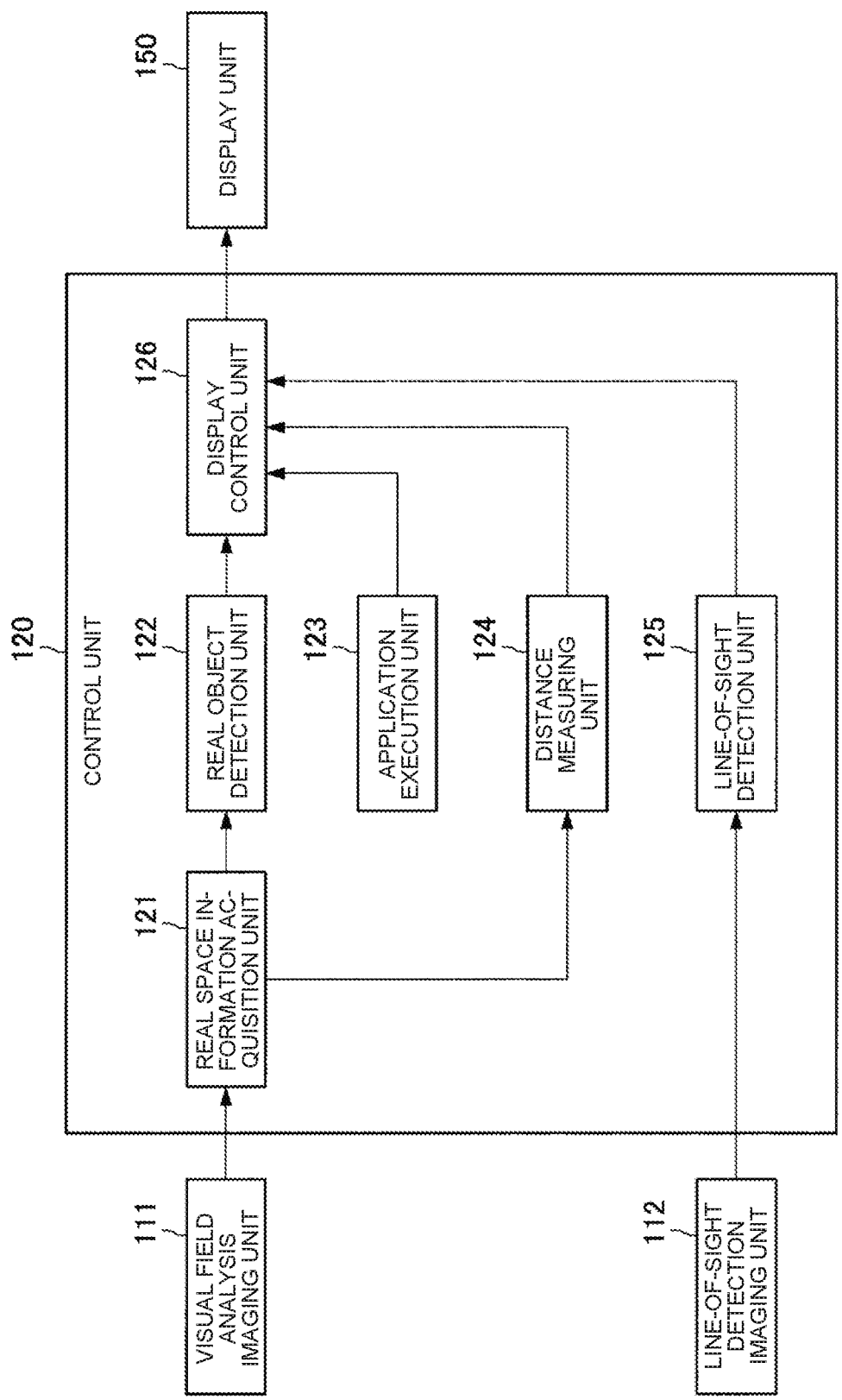
FIG. 3 is a diagram illustrating a detailed configuration example of a control unit.

The visual field analysis imaging unit 111 has a function for obtaining an image (a visual field analysis image) by imaging the visual field of the user U. For example, the visual field analysis imaging unit 111 includes a stereoscopic camera and obtains a left image and a right image which are captured by the stereoscopic camera. The left image and right image captured by the stereoscopic camera are used in the detection of distance by a distance measuring unit 124 (FIG. 3). Note that, as described earlier, various distance sensors may be used instead of the stereoscopic camera and the distance measuring unit 124. In addition, the visual field analysis imaging unit 111 may be integrated with the information processing apparatus 10 or may exist separately from the information processing apparatus 10.

The line-of-sight detection imaging unit 112 has a function for obtaining an image (a line-of-sight detection image) by imaging the eyes of the user U. For example, the line-of-sight detection imaging unit 112 includes a camera (including an image sensor) and obtains a line-of-sight detection image captured by the camera. There are no particular limitations on the number of cameras included in the line-of-sight detection imaging unit 112 as long as the number is one or more. There are also no particular limitations on the position where the line-of-sight detection imaging unit 112 is provided. For example, the line-of-sight detection imaging unit 112 may be integrated with the information processing apparatus 10 or may exist separately from the information processing apparatus 10.

The storage unit 130 is a recording medium which is configured to include a memory and which stores a program that is executed by the control unit 120 and stores data required for program execution. Furthermore, the storage unit 130 temporarily stores data for computation by the control unit 120. The storage unit 130 is configured from a magnetic storage unit device, a semiconductor storage device, an optical storage device, a magneto-optical storage device, or the like.

The display unit 150 includes a function for displaying various screens. There are no limitations on the type of the display unit 150. For example, the display unit 150 only needs to be a display (display device) capable of rendering a display enabling visual confirmation by the user. More specifically, the display unit 150 may be a liquid crystal display or may be an organic electroluminescence (EL) display.

The control unit 120 executes various control of the information processing apparatus 10. FIG. 3 is a diagram illustrating a detailed configuration example of the control unit 120. As illustrated in FIG. 3, the control unit 120 includes a real spatial information acquisition unit 121, a real object detection unit 122, an application execution unit 123, a distance measuring unit 124, a line-of-sight detection unit 125, and a display control unit 126. Details of the various functional blocks will be provided subsequently. Note that the control unit 120 is configured from one or more central processing units (CPUs), or the like, for example. If the control unit 120 is configured from a processing device such as a CPU, the processing device may be configured from an electronic circuit.

A function configuration example of the information processing apparatus 10 according to the present embodiment has been described hereinabove.

1.2. Details of Information Processing Apparatus Functions

Details of the functions of the information processing apparatus 10 according to the present embodiment will be described next. In the information processing apparatus 10 according to the embodiment of the present disclosure, the real spatial information acquisition unit 121 acquires information on a real object 40 disposed in the real space R. More specifically, the real spatial information acquisition unit 121 acquires information on the real object 40 by acquiring the left and right images taken of the real object 40 from the visual field analysis imaging unit 111.

Further, if the distance between the user U and a virtual object 30 is a first distance, the display control unit 126 exercises control such that a first display object is displayed by the display unit 150 as a virtual object on the basis of the real object 40 and first processing. In addition, if the distance between the user U and the virtual object 30 is a second distance that differs from the first distance, the display control unit 126 exercises control such that a second display object is displayed by the display unit 150 as a virtual object on the basis of the real object 40 and second processing which differs from the first processing.

According to this configuration, the virtual object display can be controlled by means of a suitable display control method according to the distance between the user U and the virtual object 30.

Here, a plurality of combinations are assumed as combinations of the first distance and the second distance. As a first example, a case where the first distance is a middle distance ($P2 \leq P < P1$) and the second distance is a remote distance ($P > P1$) is assumed. As a second example, a case where the first distance is a middle distance ($P2 \leq P < P1$) and the second distance is a short distance ($P0 \leq P < P2$) is assumed. The first and second examples will be described hereinbelow.

First, the first example will be described. FIG. 4 is a diagram to illustrate a first example of display control in a case where a virtual object 30 is disposed at a remote distance ($P > P1$). FIG. 5 is a diagram to illustrate a second example of display control in a case where a virtual object 30 is disposed at a remote distance ($P > P1$). FIG. 6 is a diagram to illustrate an example of display control in a case where a virtual object 30 is disposed at a middle distance ($P2 \leq P < P1$).

Referring to FIG. 4, in a case where a virtual object 30 is disposed at a remote distance ($P > P1$), a real object 40-1 of which the position in a real space has been detected exists in a depth map 70-1, and a virtual object 30-1 of which the position in a virtual space has been determined is illustrated overlaid thereon. Referring to FIG. 6, in a case where a virtual object 30 is disposed at a middle distance ($P2 \leq P < P1$), a real object 40-2 of which the position in a real space has been detected exists in a depth map 70-2, and a virtual object 30-2 of which the position in a virtual space has been determined is illustrated overlaid thereon.

The position of the virtual object 30-1 in a virtual space is determined by the application execution unit 123. Furthermore, the application execution unit 123 detects the position of the virtual object 30-1 in a visual field and the distance between the visual field analysis imaging unit 111 and the virtual object 30-1 on the basis of the position of the virtual object 30-1 in the virtual space and the position and attitude of the visual field analysis imaging unit 111 in a real space (the position of the virtual camera). The position and attitude of the visual field analysis imaging unit 111 in a real space may be calculated by the application execution unit 123 on the basis of a real space recognition result according to a plurality of images captured continuously over time by the visual field analysis imaging unit 111. Note that there are no particular limitations on the application type. By way of an example, the application may be a game application.

Meanwhile, the distance measuring unit 124 generates a depth map on the basis of left and right images captured by the visual field analysis imaging unit 111 and outputs the generated depth map to the display control unit 126. The real object detection unit 122 determines whether or not a predetermined real object (a hand of the user U, or the like, for example) exists in the visual field on the basis of the left and right images captured by the visual field analysis imaging unit 111. If a predetermined real object exists in the visual field, the real object detection unit 122 detects the position of the predetermined real object in the visual field and outputs the position to the display control unit 126.

The display control unit 126 is capable of recognizing a real object in front of the virtual object 30-1 on the basis of the position of the virtual object 30-1 in the visual field, the distance between the visual field analysis imaging unit 111 and the virtual object 30-1, and the depth map.

Here, as described earlier, in the example illustrated in FIG. 6, a case is assumed where the virtual object 30-2 is disposed at a middle distance (P2≤P<P1). In this case, the display control unit 126 exercises control such that a first display object is displayed by the display unit 150 as a virtual object on the basis of the real object 40-1 and first processing. However, in the example illustrated in FIG. 4, a case is assumed where the virtual object 30-1 is disposed at a remote distance (P>P1). In this case, the display control unit 126 exercises control such that a second display object is displayed by the display unit 150 as a virtual object on the basis of the real object 40-2 and second processing that differs from the first processing.

There are no particular limitations on the first processing or the second processing. However, as described earlier, if the virtual object 30-1 is disposed at a remote distance (P>P1), the display of the virtual object 30-1 may also be controlled on the basis of further simplified processing. Therefore, if the first processing when the virtual object 30-2 is disposed at a middle distance (P2≤P<P1) is processing that generates the first display object according to a first accuracy level, the second processing when the virtual object 30-1 is disposed at a remote distance (P>P1) is processing that generates the second display object according to a second accuracy level which is lower than the first accuracy level.

The accuracy for generating display objects may be lowered in any way. By way of an example, the accuracy for generating display objects may be lowered by simplifying the shape of the virtual objects and/or the real objects. A case where the shape of real objects is simplified is mainly described hereinbelow. However, the shape of virtual objects may also be simplified by means of the same technique as used to simplify the shape of real objects. Alternatively, both the shapes of the virtual objects and the real objects may be simplified.

FIG. 6 illustrates processing which, as the first processing when the virtual object 30-2 is disposed at a middle distance (P2≤P<P1), calculates a first area of the virtual object 30-2 which is located behind the real object 40-2 and removes the first area from the virtual object 30-2 to generate a first display object (a virtual object 30-22) (a visual field 80-22).

Meanwhile, the second processing when the virtual object 30-1 is disposed at a remote distance (P>P1) may be processing which calculates a second area of the virtual object 30-1 which is located behind the real object 40-1 and removes the second area from the virtual object 30-1 to generate a second display object (a virtual object), after simplifying at least a partial shape of an area in which the real object 40-1 is recognized.

At least partial shape of the area in which the real object 40-1 is recognized may be simplified by any means. By way of an example, FIG. 4 illustrates processing which, as the second processing when the virtual object 30-1 is disposed at a remote distance (P>P1), approximates the shape of the area in which the real object 40-1 is recognized to a rectangular area (a depth map 70-12), calculates a second area of the virtual object 30-1 which is located behind the rectangular area 41, and removes the second area from the virtual object 30-1 to generate a second display object (a virtual object 30-12) (a visual field 80-12).

As the example illustrated in FIG. 4, shape simplification may be performed by approximating the whole of the area in which the real object 40-1 is recognized to a rectangular shape. However, the shape simplification is not limited to this example. For example, the shape to be approximated is not limited to a rectangular shape. Furthermore, a portion of the area in which the real object 40-1 is recognized may be simplified. That is, shape simplification may also be performed by approximating at least partial shape of the area in which the real object 40-1 is recognized to a predetermined shape.

Alternatively, shape simplification may be performed by reducing the number of polygons of at least a portion of the area in which the real object 40-1 is recognized. Here, the degree to which the number of polygons is reduced may be determined beforehand. Alternatively, the degree to which the number of polygons is reduced may be determined according to the number of polygons in the area in which the real object 40-1 is recognized. For example, a difference in the number of polygons may be determined beforehand and the number of polygons in the area in which the real object 40-1 is recognized may be reduced by this difference.

Alternatively, shape simplification may be performed by projecting at least partial shape of the area in which the real object 40-1 is recognized onto a predetermined plane. There are no particular limitations on the predetermined plane. By way of an example, the predetermined plane may be a plane passing through the closest position to the visual field analysis imaging unit 111 in the area in which the real object 40-1 is recognized (for example, a plane parallel to the display plane of the display unit 150, a vertical plane, or the like), or may be a plane passing through the center of the area in which the real object 40-1 is recognized (for example, a plane parallel to the display plane of the display unit 150, a vertical plane, or the like).

Furthermore, by way of another example, the accuracy with which a display object is generated may be reduced by lowering the resolution of the depth map. FIG. 6 illustrates processing which, as the first processing when the virtual object 30-2 is disposed at a middle distance (P2≤P<P1), calculates a first area of the virtual object 30-2 which is located behind the real object 40-2 on the basis of the depth map (first depth map) generated by the distance measuring unit 124 and removes the first area from the virtual object 30-2 to generate a first display object (virtual object 30-22) (visual field 80-22).

Meanwhile, FIG. 5 illustrates processing which, as the second processing when the virtual object 30-1 is disposed at a remote distance (P>P1), calculates a second area of the virtual object 30-1 which is located behind the real object 40-1 on the basis of a depth map 70-13 (second depth map) with a lower resolution than the depth map (first depth map) generated by the distance measuring unit 124, and removes the second area from the virtual object 30-1 to generate a second display object (virtual object 30-12). Here, the degree to which the resolution is lowered may be determined beforehand.

Furthermore, by way of an example, the accuracy with which display objects are generated may be lowered by reducing the frame rate for generating the display objects. For example, the first processing when the virtual object 30-2 is disposed at a middle distance (P2≤P<P1) may be processing that calculates, using a first frame rate (a first cycle), a first area of the virtual object 30-2 which is located behind the real object 40-2 and removes the first area from the virtual object 30-2 to generate a first display object (virtual object 30-22).

Meanwhile, the second processing when the virtual object 30-1 is disposed at a remote distance (P>P1) may be processing that calculates, using a second frame rate below the first frame rate (a second cycle longer than the first cycle), a second area of the virtual object 30-1 which is located behind the real object 40-1 and removes the second area from the virtual object to generate a second display object (virtual object).

The second example will be described next. FIG. 7 is a diagram to illustrate a first example of display control in a case where a virtual object 30 is disposed at a short distance (P0≤P<P2). FIG. 8 is a diagram to illustrate a second example of display control in a case where a virtual object 30 is disposed at a short distance (P0≤P<P2). FIG. 9 is a diagram to illustrate a third example of display control in a case where a virtual object 30 is disposed at a short distance (P0≤P<P2).

Here, as described earlier, in the example illustrated in FIG. 6, a case is assumed where the virtual object 30-2 is disposed at a middle distance (P2≤P<P1). In this case, the display control unit 126 exercises control such that a first display object is displayed by the display unit 150 as a virtual object on the basis of the real object 40-1 and first processing. Meanwhile, in the example illustrated in FIGS. 7 to 9, a case is assumed where the virtual object 30-3 is disposed at a short distance (P0≤P<P2). In this case, the display control unit 126 exercises control such that a second display object is displayed by the display unit 150 as a virtual object on the basis of the real object 40-2 and second processing that differs from the second processing.

There are no particular limitations on the first processing or the second processing. However, as described earlier, if the virtual object 30-3 is disposed at a short distance (P0≤P<P2), a virtual object after area removal may be generated as a display object by removing a larger area than the blocked area from the virtual object 30-3.

Therefore, the second processing when the virtual object 30-3 is disposed at a short distance (P0≤P<P2) may be processing that calculates a second area of the virtual object 30-3 which is located behind a modified area obtained by modifying the size and/or position of the area in which the real object 40-3 is recognized and removes the second area from the virtual object 30-3 to generate a second display object.

A larger area than the blocked area is removed from the virtual object 30-3 by removing, from the virtual object 30-3, the second area located behind the area obtained by enlarging the area in which the real object 40-3 is recognized. The enlargement ratio at this time may be fixed or may be increased as the distance from the position of the user U (that is, the position of the visual field analysis imaging unit 111) to the position of the real object 40-3 increases.

In addition, a larger area than the blocked area is removed from the virtual object 30-3 by removing, from the virtual object 30-3, the modified area obtained by modifying the position of the area in which the real object 40-3 is recognized. Here, there are no limitations on the direction in which the position of the area in which the real object 40-3 is recognized is changed. However, if a hand is detected as the real object 40-3, because it is assumed that the hand will extend from the bottom to the top of the visual field, if the direction in which the position of the area in which the real object 40-3 is recognized is changed is upward, a larger area than the blocked area is removed from the virtual object 30-3.

By way of an example, FIG. 7 illustrates processing which, as the second processing when the virtual object 30-3 is disposed at a short distance (P0≤P<P2), calculates, on the basis of a depth map 70-31, a second area of the virtual object 30-3 which is located behind the area obtained by upwardly modifying the position of the area in which the real object 40-3 is recognized and removes the second area from the virtual object 30-3 to generate a second display object (a virtual object 30-31) (a visual field 80-31).

In addition, the display control unit 126 exercises control such that a predetermined image is displayed by the display unit 150 in a non-overlapping area, of the modified area obtained by modifying the position of the area in which the real object 40-3 is recognized, which does not overlap the area in which the real object 40-3 is recognized. FIG. 7 displays, as an example of the predetermined image, a cutout image 42-31 of the area in the depth map that corresponds to the non-overlapping area. If the cutout image 42-31 is thus displayed, the cutout image 42-31 can be viewed by the user U as a shadow of the real object 40-3.

The extent to which the position of the area in which the real object 40-3 is recognized is modified (an amount that corresponds to the width of the cutout image 42) may be fixed or may be increased as the distance to the position of the real object 40-3 from the position of the user U (that is, the position of the visual field analysis imaging unit 111) decreases. Referring to FIGS. 7 and 8, the distance to the user U of the real object 40-3 in the depth map 70-32 is shorter than the distance to the user U of the real object 40-3 in the depth map 70-31. Hence, the width of a cutout image 42-32 is larger than the width of the cutout image 42-31 (the visual field 80-31 and a visual field 80-32).

Referring to FIGS. 8 and 9, the distance to the user U of the real object 40-3 in a depth map 70-33 is shorter than the distance to the user U of the real object 40-3 in the depth map 70-32. Hence, the width of a cutout image 42-33 is larger than the width of the cutout image 42-32 (the visual field 80-32 and a visual field 80-33).

FIG. 10 is a diagram to illustrate a fourth example of display control in a case where a virtual object 30 is disposed at a short distance (P0≤P<P2). As illustrated in FIG. 10, the second processing when a virtual object 30 is disposed at a short distance (P0≤P<P2) may include processing that determines, as a fourth display object, the position of a model 43 displayed on the display unit 150 on the basis of the position of the area in which the real object 40-3 is recognized. In addition, the second processing may include processing in which an area of the virtual object 30-3 which does not overlap the area in which the real object 40-3 is recognized is used as a second display object (virtual object 30-31).

Here, the model 43 corresponds to the real object 40-3. In the example illustrated in FIG. 10, the real object 40-3 is detected as a hand by the real object detection unit 122. Therefore, as illustrated in FIG. 10, the display control unit 126 determines the position of the model 43 (hand model) corresponding to the hand on the basis of the position of the area in which the real object 40-3 is recognized. For example, the display control unit 126 controls the display unit 150 such that the model 43 is displayed in the position of the area in which the real object 40-3 is recognized.

FIG. 11 is a diagram to illustrate a fifth example of display control in a case where a virtual object 30 is disposed at a short distance (P0≤P<P2). As illustrated in FIG. 11, the second processing when a virtual object 30 is disposed at a short distance (P0≤P<P2) may be processing that uses the whole of the virtual object 30-3 as the second display object (virtual object 30-31) and determines, as a third display object, the position of a pointer 44 indicating the position of the area in which the real object 40-3 is recognized.

Thus, by referring to the pointer 44, the user U is able to ascertain the position of the area in which the real object 40-3 is recognized. Furthermore, because the whole of the virtual object 30-3 is displayed, the user U can easily touch and manipulate the virtual object 30-3.

Details of the functions of the information processing apparatus 10 according to the present embodiment have been described hereinabove.

1.3. Operation Example of Information Processing Apparatus

Figure 12:
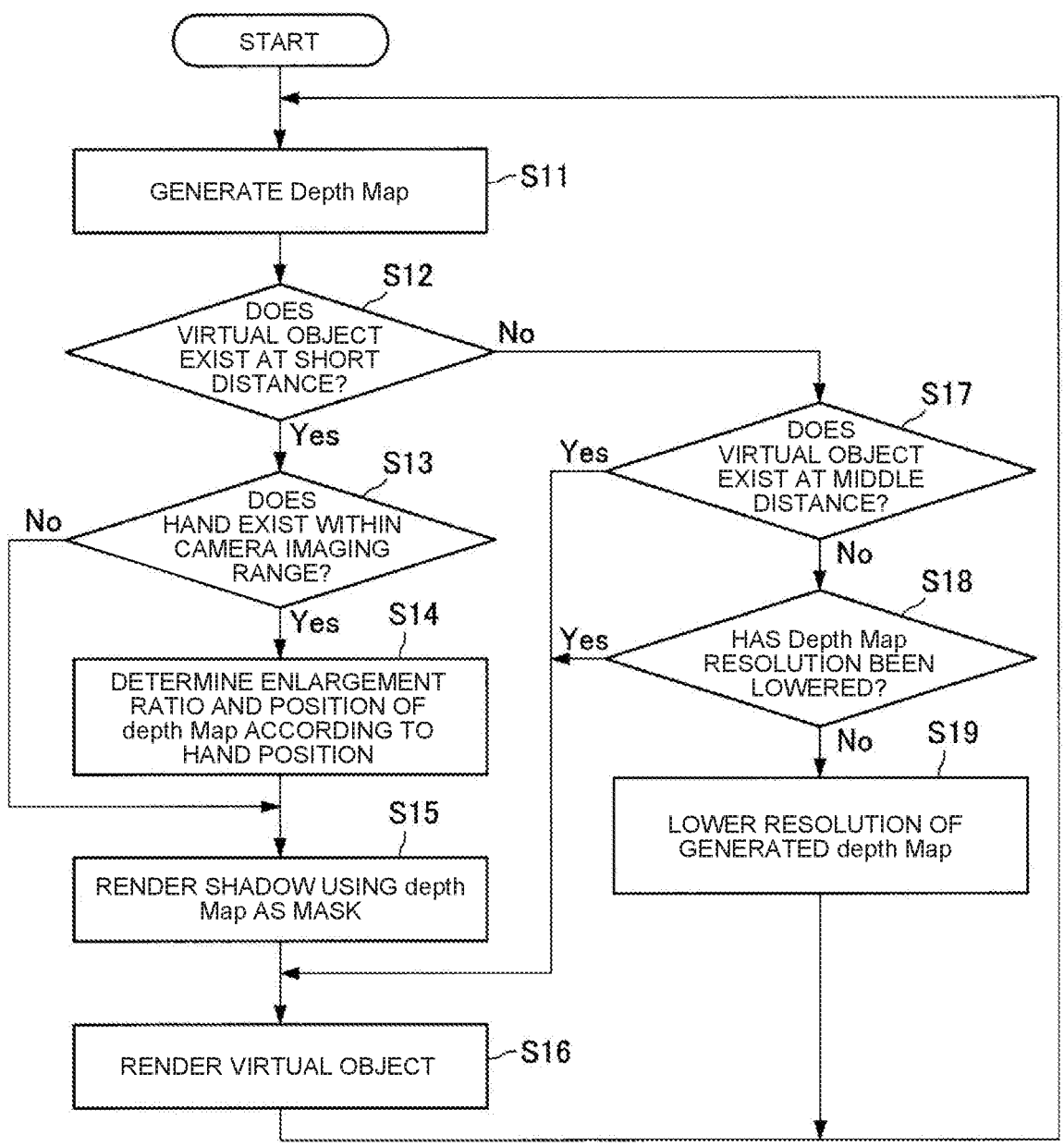
FIG. 12 is a flowchart illustrating an operation example of the information processing apparatus according to the present embodiment.

An operation example of the information processing apparatus 10 according to the present embodiment will be described next. FIG. 12 is a flowchart illustrating an operation example of the information processing apparatus 10 according to the present embodiment. Note that the operation example illustrated in FIG. 12 merely illustrates an example of the operation of the information processing apparatus 10 according to the present embodiment. Therefore, the operation of the information processing apparatus 10 according to the present embodiment is not limited to the operation example illustrated in FIG. 12.

As illustrated in FIG. 12, the distance measuring unit 124 generates a depth map on the basis of left and right images captured by the visual field analysis imaging unit 111 (S11). Furthermore, the application execution unit 123 determines the position of a virtual object in a virtual space and, on the basis of the position of the virtual object in the virtual space and the position and attitude of the visual field analysis imaging unit 111 in a real space, detects the position of the virtual object 30-1 in the visual field and the distance between the visual field analysis imaging unit 111 and the virtual object.

In a case where a virtual object does not exist at a short distance ("No" in S12), the display control unit 126 determines whether or not a virtual object exists at a middle distance (S17). The display control unit 126 moves the operation to S16 if a virtual object exists at a middle distance ("Yes" in S17). However, although the display control unit 126 moves the operation to S16 if a virtual object does not exist at a middle distance (that is, if a virtual object exists at a remote distance) ("No" in S17) and if the depth map resolution has already been lowered ("Yes" in S18), if the resolution of the depth map has not yet been lowered ("No" in S18), the display control unit 126 determines to lower the resolution of the depth map to be generated and moves the operation to S11.

The real object detection unit 122 determines whether or not a hand, which is an example of a predetermined real object, exists within the imaging range (visual field) of the stereoscopic camera (S13). If it is determined by the real object detection unit 122 that a hand does not exist within the imaging range of the stereoscopic camera ("No" in S13), the display control unit 126 moves the operation to S15. If, on the other hand, it is determined that a hand exists within the imaging range of the stereoscopic camera ("Yes" in S13), the real object detection unit 122 detects the position of the hand (the distance between the hand and the stereoscopic camera) on the basis of a depth map.

The display control unit 126 determines the enlargement ratio and position of the depth map according to the position of the hand (S14). The display control unit 126 renders a shadow by using, as a mask, a depth map according to the determined enlargement ratio and position (S15). In other words, the display control unit 126 exercises control such that a cutout image of an area in the depth map that corresponds to a non-overlapping area which does not overlap the area in which the hand is recognized, of the modified area obtained by modifying the area in which the hand is recognized, is displayed by the display unit 150 in the non-overlapping area on the basis of the determined enlargement ratio and position.

The display control unit 126 is capable of recognizing a real object in front of the virtual object 30-1 on the basis of the position of the virtual object 30-1 in the visual field, the distance between the visual field analysis imaging unit 111 and the virtual object 30-1, and the depth map. Hence, the display control unit 126 generates a display object by removing, from the virtual object, an area of the virtual object which is positioned behind the real object, on the basis of the depth map. The display control unit 126 renders (controls the display of) the generated display object as a virtual object (S16) and moves the operation to S11.

An operation example of the information processing apparatus 10 according to the present embodiment has been described hereinabove.

1.4. Various Modification Examples

The various modification examples will be described next. In the foregoing example, an example is described in which the display control unit 126 controls the display unit 150 such that a hand model is displayed in the position of the area in which the hand is recognized. However, even if a real object other than a hand (for example, a real object whose shape is a defined fixed shape or the like) is detected by the real object detection unit 122, the display control unit 126 may control the display unit 150 such that a model corresponding to the real object is displayed.

Furthermore, in the foregoing, an example is described in which, if the virtual object is disposed at a short distance (P0≤P<P2), by removing a larger area than the blocked area from the virtual object, a virtual object after area removal is generated as a display object. However, the display control unit 126 may also display a shadow of the real object at a color depth corresponding to the distance between the virtual object and the real object. For example, the display control unit 126 may display a real object shadow to be light as the distance between the user U and the real object shortens.

In addition, as described in the foregoing, the virtual object 30 is presented to the user U by the information processing apparatus 10 according to the present embodiment. Hence, the positions of a plurality of virtual objects 30 may sometimes also be determined simultaneously in the visual field of the user U. At this time, all the display objects based on each of a plurality of virtual objects may be displayed by the display unit 150. However, in order to reduce processing costs, the display control unit 126 may be configured such that only the display objects based on virtual objects of interest to the user U are displayed by the display unit 150.

For example, if the distance between the user U and each of the plurality of virtual objects 30 is a first distance, the display control unit 126 may exercise control such that a first display object is displayed by the display unit 150 on the basis of a virtual object selected from among the plurality of virtual objects. Furthermore, if the distance between the user U and each of the plurality of virtual objects 30 is a second distance, the display control unit 126 may exercise control such that a second display object is displayed by the display unit 150 on the basis of a virtual object selected from among the plurality of virtual objects.

There are no limitations on how a virtual object is selected from among the plurality of virtual objects. However, the user U is likely to focus on the virtual object closest to the position of the line of sight or hand of the user U. Thus, the display control unit 126 may select, from among the plurality of virtual objects, the virtual object closest to the position of the line of sight of the user U detected by the line-of-sight detection unit 125. Alternatively, the display control unit 126 may select, from among the plurality of virtual objects, the virtual object closest to the position of the hand in the visual field or in a real space.

Furthermore, in the foregoing, a case in which the first distance is a middle distance ($P2 \leq P < P1$) and the second distance is a remote distance ($P > P1$) has been described. The first distance is a distance equal to or greater than a threshold value Th1 and the second distance is a distance below the threshold value Th1. Here, the threshold value Th1 may be changed according to the situation. For example, as described earlier, if a virtual object is disposed at a distance below the threshold value Th1, a display object is generated at a higher accuracy level than the case where the virtual object is disposed at a distance equal to or greater than the threshold value Th1. Therefore, in a case where a situation has arisen where reduced processing costs are desired, it is preferable that the likelihood of a display object being generated at a high accuracy level is reduced by lowering the threshold value Th1.

For example, the display control unit 126 may control the threshold value Th1 on the basis of at least any one of an operation mode, a temperature, and a residual battery amount of the information processing apparatus 10. For example, if the operation mode of the information processing apparatus 10 is a power saving mode, it may be assumed that reduced processing costs are desired. Hence, if the operation mode of the information processing apparatus 10 is the power saving mode, the display control unit 126 preferably lowers the threshold value Th1.

Figure 13:
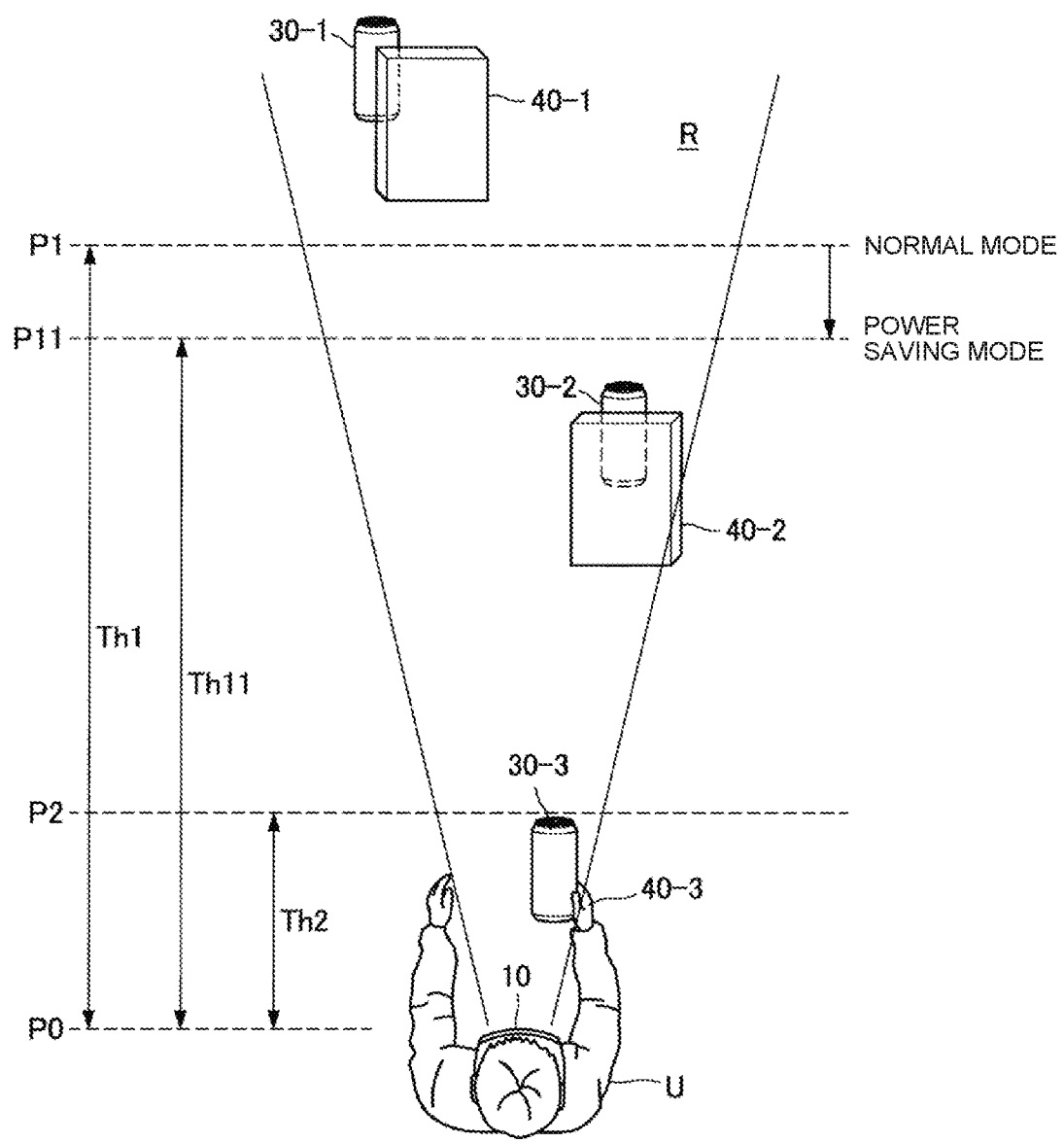
FIG. 13 is a diagram to illustrate a threshold value control example.

FIG. 13 is a diagram to illustrate an example of control of the threshold value Th1. Referring to FIG. 13, the threshold value Th1 in a case where the operation mode of the information processing apparatus 10 is a normal mode is illustrated. Meanwhile, a threshold value Th11 in a case where the operation mode of the information processing apparatus 10 is a power saving mode is illustrated (a position spaced apart by a distance Th11 from the position P0 where the user U exists illustrated as the "position P11"). Thus, the display control unit 126 preferably lowers the threshold value Th1 to the threshold value Th11 when the operation mode of the information processing apparatus 10 is the power saving mode. Note that the threshold value Th11 may also be determined beforehand.

In addition, if the temperature of the information processing apparatus 10 is above a predetermined temperature, for example, it may be assumed that reduced processing costs are desired. Hence, if the temperature of the information processing apparatus 10 is above a predetermined temperature, the display control unit 126 preferably lowers the threshold value Th1. The temperature of the information processing apparatus 10 may be a temperature in any position but may also be the temperature of the processor that causes the information processing apparatus 10 to operate. Furthermore, if a thermometer is installed in the information processing apparatus 10, the temperature of the information processing apparatus 10 may be measured by the thermometer.

In addition, if the residual battery amount for operating the information processing apparatus 10 is below a predetermined residual amount, for example, it may be assumed that reduced processing costs are desired. Hence, if the residual battery amount for operating the information processing apparatus 10 is below a predetermined residual amount, the display control unit 126 may lower the threshold value Th1.

2. HARDWARE CONFIGURATION EXAMPLE

Figure 14:
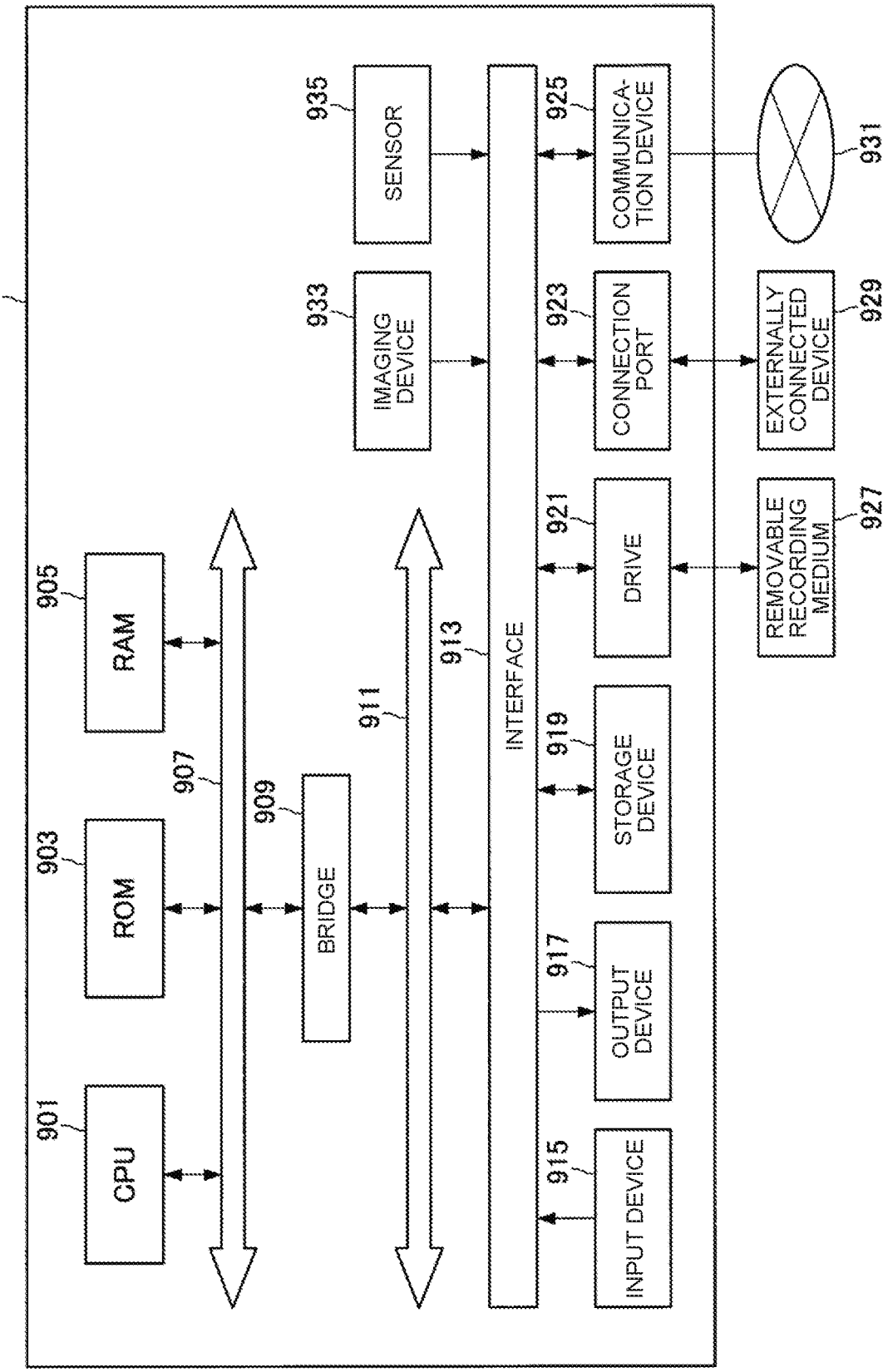
FIG. 14 is a block diagram illustrating a hardware configuration example of the information processing apparatus according to the embodiment of the present disclosure.

A hardware configuration example of the information processing apparatus 10 according to the embodiment of the present disclosure will be described next with reference to FIG. 14. FIG. 14 is a block diagram illustrating a hardware configuration example of the information processing apparatus 10 according to the embodiment of the present disclosure.

As illustrated in FIG. 14, the information processing apparatus 10 includes a central processing unit (CPU) 901, a read-only memory (ROM) 903, and a random-access memory (RAM) 905. The information processing apparatus 10 may also include a host bus 907, a bridge 909, an external bus 911, an interface 913, an input device 915, an output device 917, a storage device 919, a drive 921, a connection port 923, and a communications device 925. In addition, the information processing apparatus 10 may include an imaging device 933 and a sensor 935 where necessary. The information processing apparatus 10 may include, instead of or in addition to the CPU 901, a processing circuit known as a digital signal processor (DSP) or an application specific integrated circuit (ASIC).

The CPU 901 functions as an arithmetic processing unit and a control device and controls all or part of the operation in the information processing apparatus 10 according to various programs recorded on the ROM 903, the RAM 905, the storage device 919, or a removable recording medium 927. The ROM 903 stores programs, arithmetic parameters, and the like, which are used by the CPU 901. The RAM 905 temporarily stores the programs used in the execution of the CPU 901, the parameters that suitably vary in this execution, and the like. The CPU 901, ROM 903, and RAM 905 are interconnected by the host bus 907, which is constituted by an internal bus such as a CPU bus. In addition, the host bus 907 is connected to the external bus 911 such as a peripheral component interconnect/interface (PCI) bus, via the bridge 909.

The input device 915 is a device that is manipulated by the user such as a mouse, a keyboard, a touch panel, a button, a switch, or a lever. The input device 915 may include a microphone that detects the voice of the user. The input device 915 may, for example, be a remote-control device that uses infrared rays or other electric waves or may be an externally connected device 929 such as a mobile phone that corresponds to the operation of the information processing apparatus 10. The input device 915 includes an input control circuit that generates an input signal on the basis of information input by the user and outputs the input signal to the CPU 901. By manipulating the input device 915, the user inputs various data to the information processing apparatus 10 and instructs processing operations. Furthermore, the imaging device 933, described subsequently, may function as an input device by imaging movement of the hands of the user, the fingers of the user, and so forth. At this time, a pointing position may be determined according to the movement of the hands and the orientation of the fingers.

The output device 917 is configured from a device that is capable of notifying the user visually or auditorily of acquired information. The output device 917 may, for example, be a display device such as a liquid crystal display (LCD), a plasma display panel (PDP), an organic electroluminescence (EL) display, or a projector, or a hologram display device, a speech output device such as a speaker or headphones, or a printer device, or the like. The output device 917 outputs the results obtained from processing by the information processing apparatus 10 as video of text or images, or the like, or outputs the results as speech such as voice or audio. In addition, the output device 917 may include a light or the like, for illuminating the surroundings.

The storage device 919 is a device for data storage that is configured as an example of the storage unit of the information processing apparatus 10. The storage device 919 is configured from a magnetic storage unit device such as a hard disk drive (HDD), a semiconductor storage device, an optical storage device, or a magneto-optical storage device, or the like, for example. The storage device 919 stores programs executed by the CPU 901, various data, various data acquired from outside, or the like.

The drive 921 is a reader/writer for the removable recording medium 927 such as a magnetic disk, an optical disk, a magneto-optical disk, or a semiconductor memory, and is installed in or externally attached to the information processing apparatus 10. The drive 921 reads information recorded on the mounted removable recording medium 927 and outputs the information to the RAM 905. Furthermore, the drive 921 writes recordings to the mounted removable recording medium 927.

The connection port 923 is a port for directly connecting a device to the information processing apparatus 10. The connection port 923 may be a universal serial bus (USB) port, an IEEE1394 port, a small computer system interface (SCSI) port, or the like, for example. Furthermore, the connection port 923 may be an RS-232C port, an optical audio terminal, a high-definition multimedia interface (HDMI) (registered trademark) port, or the like. By connecting the externally connected device 929 to the connection port 923, various data can be exchanged between the information processing apparatus 10 and the externally connected device 929.

The communications device 925 is a communication interface that is configured from a communications device or the like, for connecting to a communications network 931, for example. The communications device 925 may, for example, be a communication card used for a wired or wireless local area network (LAN), Bluetooth (registered trademark), or wireless USB (WUSB), or the like. In addition, the communications device 925 may be an optical communications router, an asymmetric digital subscriber line (ADSL) router, or a modem for various communications, or the like. The communications device 925 sends and receives signals and the like by using a predetermined protocol such as TCP/IP between the internet and another communications device, for example. Furthermore, the communications network 931 connected to the communications device 925 is a wire-connected or wirelessly connected network, such as, the internet, a domestic LAN, an infrared communications network, a radio wave communications, or satellite communications network.

The imaging device 933 is, for example, a device that generates captured images by imaging a real space by using various members such as a charge-coupled device (CCD) or complementary metal-oxide semiconductor (CMOS), a lens for controlling the focusing of an object image on the imaging device, and the like. The imaging device 933 may capture still images or may capture moving images.

The sensor 935 is, for example, various sensors such as a distance measuring sensor, an acceleration sensor, a gyro sensor, a geomagnetic sensor, an optical sensor, and a sound sensor. The sensor 935 acquires information relating to the state of the information processing apparatus 10 itself such as the attitude of the enclosure of the information processing apparatus 10, or information relating to the peripheral environment of the information processing apparatus 10 such as the peripheral brightness and noises of the information processing apparatus 10, for example. In addition, the sensor 935 may include a global positioning system (GPS) sensor that measures the longitude, latitude and altitude of the apparatus by receiving a GPS signal.

3. CONCLUSION

As described hereinabove, the embodiment of the present disclosure provides an information processing apparatus 10 that includes a real spatial information acquisition unit 121 that acquires information on a real object disposed in a real space; and a display control unit 126 that, if a distance between a user and a virtual object is a first distance, exercises control such that a first display object is displayed by a display device as the virtual object on the basis of the real object and first processing, and that, if the distance between the user and the virtual object is a second distance that differs from the first distance, exercises control such that a second display object is displayed by the display device as the virtual object on the basis of the real object and second processing that differs from the first processing.

According to this configuration, the virtual object display can be controlled by means of a suitable display control method according to the distance between the user and the virtual object.

Preferred embodiments of the present disclosure have been described in detail hereinabove with reference to the accompanying drawings, but the technical scope of the present disclosure is not limited to such examples. It is obvious that a person ordinarily skilled in the art of the disclosure could arrive at various modification examples or revised examples within the scope of the technological ideas disclosed in the claims, and it is naturally understood that such examples belong to the technical scope of the present disclosure.

Furthermore, a program that causes hardware such as a CPU, ROM, and RAM built into a computer to exhibit the same functions as the functions of the foregoing control unit 120 can also be created. Moreover, a computer-readable recording medium on which the program is recorded may also be provided.

For example, as long as the operation of the foregoing information processing apparatus 10 is implemented, there are no particular limitations on the positions of each configuration. A portion of the processing of each unit in the information processing apparatus 10 may also be performed by a server apparatus (not illustrated). As a specific example, some or all of the blocks of the control unit 120 in the information processing apparatus 10 may exist in a server apparatus (not illustrated). For example, some or all of the functions of the real object detection unit 122, the application execution unit 123, the distance measuring unit 124, and the line-of-sight detection unit 125 in the information processing apparatus 10 may exist in a server apparatus (not illustrated).

Furthermore, the advantageous effects disclosed in the present specification are only descriptive or exemplary, and non-limiting. In other words, the technology according to the present disclosure affords, in addition to or instead of the foregoing advantageous effects, other advantageous effects which are obvious to a person skilled in the art on the basis of the disclosures of the present specification.

Note that the following configurations also belong to the technical scope of the present disclosure.

(1)

An information processing apparatus comprising:

a spatial information acquisition unit that acquires information on a real object disposed in a real space; and a display control unit that, if a distance between a user and a virtual object is a first distance, exercises control such that a first display object is displayed by a display device as the virtual object on the basis of the real object and first processing, and that, if the distance between the user and the virtual object is a second distance that differs from the first distance, exercises control such that a second display object is displayed by the display device as the virtual object on the basis of the real object and second processing that differs from the first processing.

(2)

The information processing apparatus according to (1), wherein the first processing is processing that generates the first display object according to a first accuracy level, and wherein the second processing is processing that generates the second display object according to a second accuracy level which is lower than the first accuracy level.

(3)

The information processing apparatus according to (2), wherein the first processing is processing that calculates a first area of the virtual object which is located behind the real object on the basis of a first depth map and removes the first area from the virtual object to generate the first display object, and wherein the second processing is processing that calculates a second area of the virtual object which is located behind the real object on the basis of a second depth map with a lower resolution than the first depth map and removes the second area from the virtual object to generate the second display object.

(4)

The information processing apparatus according to (2), wherein the first processing is processing that calculates a first area of the virtual object which is located behind the real object and removes the first area from the virtual object to generate the first display object, and wherein the second processing is processing which performs processing that calculates a second area of the virtual object which is located behind the real object and removes the second area from the virtual object to generate the second display object, after simplifying at least a partial shape of an area in which the virtual object and the real object are recognized.

(5)

The information processing apparatus according to (4), wherein the simplification includes processing that reduces the number of polygons in the at least partial shape.

(6)

The information processing apparatus according to (4) or (5), wherein the simplification includes processing that approximates the at least partial shape to a predetermined shape.

(7)

The information processing apparatus according to any one of (4) to (6), wherein the simplification includes processing that projects the at least partial shape onto a predetermined plane.

(8)

The information processing apparatus according to (2), wherein the first processing is processing that calculates, using a first frame rate, a first area of the virtual object which is located behind the real object and removes the first area from the virtual object to generate the first display object, and wherein the second processing is processing that calculates, using a second frame rate that is lower than the first frame rate, a second area of the virtual object which is located behind the real object and removes the second area from the virtual object to generate the second display object.

(9)

The information processing apparatus according to (1), wherein the first processing is processing that calculates a first area of the virtual object which is located behind the real object and removes the first area from the virtual object to generate the first display object, and wherein the second processing is processing that calculates a second area of the virtual object which is located behind a modified area obtained by modifying the size and/or position of an area in which the real object is recognized and removes the second area from the virtual object to generate the second display object.

(10)

The information processing apparatus according to (9), wherein, if the distance between the user and the virtual object is the second distance, the display control unit exercises control such that a predetermined image is displayed by the display device in an area, of the modified area, which does not overlap the area in which the real object is recognized.

(11)

The information processing apparatus according to (9), wherein the first processing is processing that calculates a first area of the virtual object which is located behind the real object and removes the first area from the virtual object to generate the first display object, and wherein the second processing is processing that uses the virtual object as the second display object and determines, as a third display object, the position of a pointer indicating the position of the area in which the real object is recognized.

(12)

The information processing apparatus according to (9), wherein the first processing is processing that calculates a first area of the virtual object which is located behind the real object and removes the first area from the virtual object to generate the first display object, and wherein the second processing is processing that determines, as a fourth display object, the position of a model corresponding to the real object on the basis of the position of the area in which the real object is recognized and uses an area, of the virtual object, which does not overlap the area in which the real object is recognized, as the second display object.

(13)

The information processing apparatus according to any one of (1) to (12), wherein, if the distance between the user and each of a plurality of virtual objects is a first distance, the display control unit exercises control such that the first display object is displayed by the display device on the basis of a virtual object selected from among the plurality of virtual objects.

(14)

The information processing apparatus according to (13), wherein the display control unit selects, from among the plurality of virtual objects, the virtual object closest to the position of the line of sight or the hand of the user.

(15)

The information processing apparatus according to any one of (1) to (14), wherein the first distance is a distance equal to or greater than a threshold value, wherein the second distance is a distance below the threshold value, and wherein the display control unit controls the threshold value on the basis of at least any one of an operation mode, a temperature, and a residual battery amount of the information processing apparatus.

(16)

The information processing apparatus according to (15), wherein, if the operation mode is a power saving mode, the display control unit lowers the threshold value.

(17)

The information processing apparatus according to (15), wherein, if the temperature is above a predetermined temperature, the display control unit lowers the threshold value.

(18)

The information processing apparatus according to (15), wherein, if the residual battery amount is below a predetermined residual amount, the display control unit lowers the threshold value.

(19)

An information processing method comprising:

acquiring, by a processor, information on a real object disposed in a real space; and if a distance between a user and a virtual object is a first distance, exercising control such that a first display object is displayed by a display device as the virtual object on the basis of the real object and first processing, and if the distance between the user and the virtual object is a second distance that differs from the first distance, exercising control such that a second display object is displayed by the display device as the virtual object on the basis of the real object and second processing that differs from the first processing.

(20)

A program for causing a computer to function as an information processing apparatus that comprises:

a spatial information acquisition unit that acquires information on a real object disposed in a real space; and a display control unit that, if the distance between a user and a virtual object is a first distance, exercises control such that a first display object is displayed by a display device as the virtual object on the basis of the real object and first processing, and that, if the distance between the user and the virtual object is a second distance that differs from the first distance, exercises control such that a second display object is displayed by the display device as the virtual object on the basis of the real object and second processing that differs from the first processing.

REFERENCE SIGNS LIST

10 INFORMATION PROCESSING APPARATUS
111 VISUAL FIELD ANALYSIS IMAGING UNIT
112 LINE-OF-SIGHT DETECTION IMAGING UNIT
120 CONTROL UNIT
121 REAL SPATIAL INFORMATION ACQUISITION UNIT
122 REAL OBJECT DETECTION UNIT
123 APPLICATION EXECUTION UNIT
124 DISTANCE MEASURING UNIT
125 LINE-OF-SIGHT DETECTION UNIT
126 DISPLAY CONTROL UNIT
130 STORAGE UNIT
150 DISPLAY UNIT
30 VIRTUAL OBJECT
40 REAL OBJECT
41 RECTANGULAR AREA
42 CUTOUT IMAGE
43 MODEL
44 POINTER
70 DEPTH MAP
80 VISUAL FIELD

The invention claimed is:

1. An information processing apparatus, comprising:
a spatial information acquisition unit configured to acquire information on a real object disposed in a real space; and
a display control unit configured to:
control, based on a distance between a user and a virtual object is a first distance, a display screen to display a first display object as the virtual object, wherein the display of the first display object is based on the real object and first processing; and
control, based on the distance between the user and the virtual object is a second distance, the display screen to display a second display object as the virtual object, wherein
the second distance is different from the first distance,
the display of the second display object is based on the real object and second processing, and
the second processing is different from the first processing.

2. The information processing apparatus according to claim 1, wherein
in the first processing, the display control unit is further configured to generate the first display object based on a first accuracy level,
in the second processing, the display control unit is further configured to generate the second display object according to a second accuracy level, and
the second accuracy level is lower than the first accuracy level.

3. The information processing apparatus according to claim 2, wherein
in the first processing, the display control unit is further configured to:

calculate, based on a first depth map, a first area of the virtual object which is located behind the real object; and remove the first area from the virtual object to generate the first display object, in the second processing the display control unit is further configured to:

calculate, based on a second depth map, a second area of the virtual object; and remove the second area from the virtual object to generate the second display object, and a resolution of the second depth map is lower than a resolution of the first depth map.

4. The information processing apparatus according to claim 2, wherein in the first processing, the display control unit is further configured to:

calculate a first area of the virtual object which is located behind the real object; and remove the first area from the virtual object to generate the first display object, and in the second processing, the display control unit is further configured to:

recognize a specific area that includes the virtual object and the real object;

simplify at least a partial shape of the specific area;

calculate, based on the simplified at least the partial shape of the specific area, a second area of the virtual object which is located behind the real object; and remove the second area from the virtual object to generate the second display object.

5. The information processing apparatus according to claim 4, wherein the display control unit is further configured to simplify the at least the partial shape of the specific area based on reduction of a number of polygons in the at least the partial shape of the specific area.

6. The information processing apparatus according to claim 4, wherein the display control unit is further configured to simplify the at least the partial shape of the specific area based on approximation of the at least the partial shape of the specific area to a specific shape.

7. The information processing apparatus according to claim 4, wherein the display control unit is further configured to simplify the at least the partial shape of the specific area based on projection of the at least the partial shape of the specific area onto a specific plane.

8. The information processing apparatus according to claim 2, wherein in the first processing, the display control unit is further configured to:

calculate, based on a first frame rate, a first area of the virtual object which is located behind the real object; and remove the first area from the virtual object to generate the first display object, and in the second processing, the display control unit is further configured to:

calculate, based on a second frame rate that is lower than the first frame rate, a second area of the virtual object which is located behind the real object; and remove the second area from the virtual object to generate the second display object.

9. The information processing apparatus according to claim 1, wherein in the first processing, the display control unit is further configured to:

calculate a first area of the virtual object which is located behind the real object; and remove the first area from the virtual object to generate the first display object, and in the second processing, the display control unit is further configured to:

recognize a first specific area that includes the real object;

modify at least one of a size or a position of the first specific area to generate a modified area;

calculate a second area of the virtual object which is located behind the modified area; and remove the second area from the virtual object to generate the second display object.

10. The information processing apparatus according to claim 9, wherein, the display control unit is further configured to control, based on the distance between the user and the virtual object is the second distance, the display screen to display a specific image in a second specific area of the modified area, and the second specific area does not overlap the first specific area in which the real object is recognized.

11. The information processing apparatus according to claim 9, wherein in the first processing, the display control unit is further configured to:

calculate a first area of the virtual object which is located behind the real object; and remove the first area from the virtual object to generate the first display object, and in the second processing, the display control unit is further configured to determine, as a third display object, the position of a pointer that indicates the position of the first specific area.

12. The information processing apparatus according to claim 9, wherein in the first processing, the display control unit is further configured to:

calculate a first area of the virtual object which is located behind the real object; and remove the first area from the virtual object to generate the first display object, and in the second processing the display control unit is further configured to:

determine, as a fourth display object, the position of a model corresponding to the real object, wherein the position of the model is determined based on the position of the first specific area in which the real object is recognized; and determine, a second specific area of the virtual object which does not overlap the first specific area, as the second display object.

13. The information processing apparatus according to claim 1, wherein the display control unit is further configured to control the display screen to display, based on the distance between the user and each of a plurality of virtual objects is a first distance, the first display object, and the display of the first display object is on a virtual object selected from among the plurality of virtual objects.

14. The information processing apparatus according to claim 13, wherein the display control unit is further configured to select, from among the plurality of virtual objects, the virtual object closest to a position of one of a line of sight of the user or a hand of the user.

15. The information processing apparatus according to claim 1, wherein
the first distance is equal to or greater than a threshold value,
the second distance is below the threshold value, and
the display control unit is further configured to control the threshold value based on at least one of an operation mode, a temperature, or a residual battery amount of the information processing apparatus.

16. The information processing apparatus according to claim 15, wherein the display control unit is further configured to lower the threshold value based on the operation mode is a power saving mode.

17. The information processing apparatus according to claim 15, wherein the display control unit is further configured to lower the threshold value based on the temperature is above a specific temperature.

18. The information processing apparatus according to claim 15, wherein the display control unit is further configured to lower the threshold value based on the residual battery amount is below a specific residual amount.

19. An information processing method, comprising:
acquiring information on a real object disposed in a real space;
controlling, based on a distance between a user and a virtual object is a first distance, a display screen to display a first display object as the virtual object, wherein the display of the first display object is based on the real object and first processing; and
controlling, based on the distance between the user and the virtual object is a second distance, the display screen to display a second display object as the virtual object, wherein
the display of the second display object is based on the real object and second processing,
the second distance is different from the first distance, and
the second processing is different from the first processing.

20. A non-transitory computer-readable medium having stored thereon computer-executable instructions that, when executed by an information processing apparatus, cause the information processing apparatus to execute operations, the operations comprising:
acquiring information on a real object disposed in a real space;
controlling, based on a distance between a user and a virtual object is a first distance, a display screen to display a first display object as the virtual object, wherein the display of the first display object is based on the real object and first processing; and
controlling, based on the distance between the user and the virtual object is a second distance, the display screen to display a second display object as the virtual object, wherein the display of the second display object is based on the real object and second processing,
the second distance is different form the first distance, and
the second processing is different from the first processing.

* * * * *